United States Patent [19]

Miyata et al.

[11] 4,351,814

[45] Sep. 28, 1982

[54] HYDROTALCITES HAVING A HEXAGONAL NEEDLE-LIKE CRYSTAL STRUCTURE AND PROCESS FOR PRODUCTION THEREOF

[75] Inventors: Shigeo Miyata; Akira Okada, both of Takamatsu, Japan

[73] Assignee: Kyowa Chemical Industry Co., Ltd., Tokyo, Japan

[21] Appl. No.: 218,017

[22] Filed: Dec. 18, 1980

[51] Int. Cl.$^3$ .............................................. C01G 39/00
[52] U.S. Cl. ................................ 423/306; 260/429 R; 260/429.5; 260/438.5 R; 260/438.5 C; 260/439 R; 260/448 R; 423/327; 423/331; 423/365; 423/397; 423/432; 423/463; 423/464; 423/465; 423/554; 423/593; 423/594; 423/596; 423/598; 423/600
[58] Field of Search ............... 423/636, 463, 397, 464, 423/465, 430, 432, 326, 327, 554, 308, 593, 594, 600, 596, 598, 306, 331, 365; 260/429 R, 439 R, 429.5, 448 R, 438.5 R, 438.5 C

[56] References Cited

U.S. PATENT DOCUMENTS 3,796,792   3/1974   Miyata et al. ..................... 423/595
3,879,523   4/1975   Miyata et al. ..................... 423/595
3,879,525   4/1975   Miyata et al. ..................... 423/595

FOREIGN PATENT DOCUMENTS 54-2017066  10/1979  Japan .

Primary Examiner—O. R. Vertiz
Assistant Examiner—Wayne A. Langel
Attorney, Agent, or Firm—Wenderoth, Lind & Ponack

[57] ABSTRACT

Fibrous hydrotalcites having a hexagonal needle-like crystal structure. The fibrous hydrotalcites are produced by contacting a basic magnesium compound having a needle-like crystal structure and expressed by the following formula (2)

$$Mg(OH)_{2-n'x_2}A_{x_2}{}^{n'-}\cdot m_2H_2O \qquad (2)$$

wherein $A^{n'-}$ represents a monovalent or divalent anion, $n'$ is 1 or 2, and $x_2$ and $m_2$ are numbers satisfying the following conditions, $$0.2 \leq x_2 \leq 0.5,$$

$$0 \leq m_2 \leq 2,$$

with a compound capable of providing a trivalent metal cation and being soluble in a liquid reaction medium which is chemically inert and is a non-solvent for the basic magnesium compound, the contacting being carried out in said liquid reaction medium under conditions which do not cause a loss of the needle-like crystal form of the basic magnesium compound, while maintaining the ratio of $M^{3+}$ to the sum of Mg and $M^{3+}$ at $0 < M^{3+}/(Mg+M^{3+}) \leq 0.6$ and the pH of the contacting system at not less than 9.

4 Claims, 5 Drawing Figures

Figure 2A:
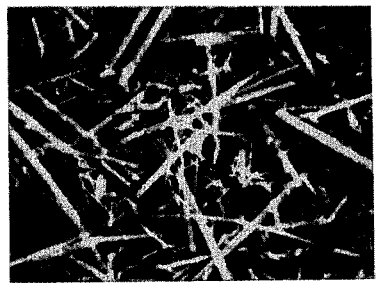
Figure 2B:
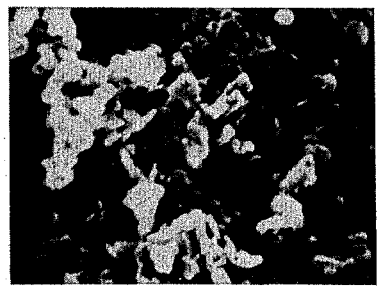

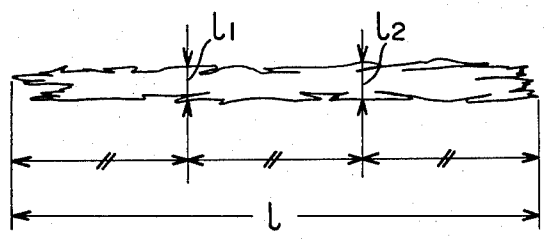
Fig. 2-A'

HYDROTALCITES HAVING A HEXAGONAL NEEDLE-LIKE CRYSTAL STRUCTURE AND PROCESS FOR PRODUCTION THEREOF

This invention relates to hydrotalcites having a hitherto unknown crystal shape, and to a process for production thereof. The novel hydrotalcites have utility in new fields as well as in conventional applications of hydrotalcites because of their useful characteristics such as their unique and hitherto unknown fibrous shape.

More specifically, this invention pertains to hydrotalcites having a hexagonal needle-like crystal structure (to be sometimes referred to as fibrous hydrotalcites) which have a length-to-diameter ratio, determined by an electron microscope at a magnification of 1000 X, of at least about 10; and to a process for production thereof.

It is well known that hydrotalcites have a hexagonal plate-like crystal structure. A conventional hydrotalcite, when viewed under an optical or electron microscope, lokks like a hexagonal or rounded hexagonal plate-like crystal, its fragments or an assembly of these, and the ratio of its maximum length (maximum diameter) to its minimum length (minimum diameter) is less than 5, and usually about 1 to 3.

The present inventors worked on the production of hydrotalcites from basic magnesium compounds, and discovered that there exist fibrous hydrotalcites having a hexagonal needle-like crystal structure, and that these novel hydrotalcites can be easily produced by a commercially advantageous synthetic process.

It has also been found that because of their useful characteristics such as their fibrous or needle-like shape, the novel hydrotalcites of the invention are widely useful not only in known applications of hydrotalcites but also in applications in which inorganic fibrous materials such as glass fibers or asbestos are useful.

It is an object of this invention therefore to provide novel fibrous synthetic hydrotalcites.

Another object of this invention is to provide a process for advantageously producing said fibrous synthetic hydrotalcites.

The above and other objects and advantages of this invention will become more apparent from the following description.

Figure 1A:
Figure 1B:
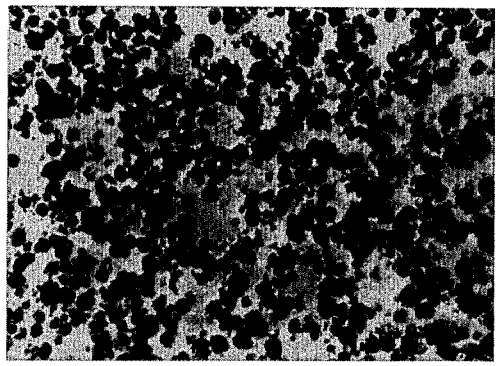

To facilitate an understanding of the present invention, a conventional hydrotalcite having a hexagonal plate-like structure and the fibrous hydrotalcite of this invention having a hexagonal needle-like crystal structure are explained below by reference to the accompanying drawings in which:

FIG. 1-A is a photograph of one example of the fibrous hydrotalcite having the formula $Mg_{0.8}Al_{0.2}(OH)_2(CO_3)_{0.1}.0.52H_2O$, which was taken under an optical microscope at 150 X; and FIG. 1-B is a photograph taken similarly of one example of a known hydrotalcite having a hexagonal plate-like crystal structure and represented by the formula $Mg_{0.8}Al_{0.2}(OH)_2(CO_3)_{0.1}.0.52H_2O$.

FIG. 2-A is a photograph of one example of the fibrous hydrotalcite of this invention having the same composition as above, which was taken under an electron microscope at 1000 X; and FIG. 2-B is a photograph of one example of the known hydrotalcite of FIG. 1-B which was taken under an electron microscope at 10,000 X.

As can be seen from a comparison of FIG. 1-A with FIG. 1-B, and FIG. 2-A with FIG. 2-B, the hydrotalcite of this invention differs from the conventional hydrotalcite having a hexagonal plate-like crystal structure in that the former apparently has quite a different fibrous shape or needle-like shape.

The hydrotalcite of this invention has a length-to-diameter ratio, determined under an electron microscope at 1000 X, of at least about 10, in many cases about 30 to about 50 or more, as seen from FIG. 2-A, and its fibrous shape can be observed also under an optical microscope, as seen from FIG. 1-A. The fibrous hydrotalcite of this invention usually has an average diameter of about 0.01 to about 10 microns, and a length of about 5 to about 10,000 microns.

The length-to-diameter ratio of the hydrotalcite of this invention determined under an electron microscope at 1,000 X is obtained by approximately equally dividing one fibrous crystal shown in the photograph of FIG. 2-A along its length into three sections, measuring its diameters crossing the two equally dividing points at right angles to its length, arithmetically averaging the two measured diameters, and dividing the length of the crystal by the average diameter calculated. For example, in a model drawing of a fibrous crystal shown in FIG. 2-A', the length-to-diameter ratio of the crystal is given by $$l/\frac{l_1+l_2}{2}.$$

The fibrous hydrotalcite of this invention can be produced, for example, by contacting a basic magnesium compound having a needle-like crystal structure and expressed by the following formula (2)

$$Mg(OH)_{2-n'x_2}A_{x_2}{}^{n'-}.m_2H_2O \qquad (2)$$

wherein $A^{n'-}$ represents a monovalent or divalent anion, $n'$ is 1 or 2, and $x_2$ and $m_2$ are numbers satisfying the following conditions, $0.2 \leq x_2 \leq 0.5,$ $0 \leq m_2 \leq 2,$ with a compound capable of providing a trivalent metal cation and being soluble in a liquid reaction medium which is chemically inert and is a non-solvent for the basic magnesium compound, the contacting being carried out in said liquid reaction medium under conditions which do not cause a loss of the needle-like crystal form of the basic magnesium compound, while maintaining the ratio of $M^{3+}$ to the sum of Mg and $M^{3+}$ at $0 < M^{3+}/(Mg+M^{3+}) \leq 0.6$ and the pH of the contacting system at not less than 9.

Preferred examples of the anion $A^{n'-}$ of the basic magnesium compound as a starting material are $Cl^-$, $Br^-$, $NO_3^-$ or $SO_4^{2-}$. Examples of the basic magnesium compound having a needle-like crystal structure used in the production of the fibrous hydrotalcites of this invention are the following compounds described in the X-ray powder data file of ASTM.

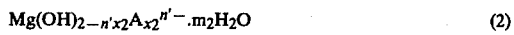

| (ASTM No.7-403) | |
|---|---|
| $Mg_2(OH)_3Cl.3H_2O$ | :$Mg(OH)_{1.5}.1.5H_2O$ |
| (ASTM No.7-409) | |
| $Mg_{10}(OH)_{18}Cl_2.5H_2O$ | :$Mg(OH)_{1.8}Cl_{0.2}.0.5H_2O$ |

| (ASTM No.7-412) | |
|---|---|
| $Mg_2(OH)_3Cl.4H_2O$ | $:Mg(OH)_{1.5}Cl_{0.5}.2H_2O$ |
| (ASTM No.7-411) | |
| $Mg_2(OH)_3Br.4H_2O$ | $:Mg(OH)_{1.5}Br_{0.5}.2H_2O$ |
| (ASTM No.7-415) | |
| $Mg_6(OH)_{10}SO_4.3H_2O$ | $:Mg(OH)_{5/3}(SO_2)_{1/6}.0.5H_2O$ |
| (ASTM No.7-416) | |
| $Mg_3(OH)_5Cl.3H_2O$ | $:Mg(OH)_{5/3}Cl_{1/3}.H_2O$ |
| (ASTM No.7-419) | |
| $Mg_2(OH)_3Cl.2H_2O$ | $:Mg(OH)_{3/2}Cl_{1/2}.H_2O$ |
| (ASTM No.7-420) | |
| $Mg_3(OH)_5Cl.4H_2O$ | $:Mg(OH)_{5/3}Cl_{1/3}.4/3H_2O$ |

Examples of suitable compounds soluble in the liquid reaction medium and capable of giving a trivalent metal cation $M^{3+}$ include sodium aluminate, potassium aluminate, aluminum sulfate, aluminum chloride, aluminum nitrate, ferric sulfate, ferric chloride, ferric nitrate, chromium sulfate, chromium nitrate, chromium chloride, yttrium chloride, titanium trichloride and indium trichloride.

Examples of the liquid reaction medium are water, ketones such as methanol or ethanol. These media may be used singly or in combination with each other.

In order to maintain the pH of the reaction system at not less than 9, various alkalies may be used. Examples include sodium hydroxide, potassium hydroxide, sodium carbonate, potassium carbonate, calcium hydroxide, ammonia, aqueous ammonia, sodium aluminate, potassium aluminate and water glass. The use of such alkalies may be omitted when the anion of the starting compound capable of providing a trivalent metal cation $M^{3+}$ can be a source of alkali of a kind and in an amount sufficient to adjust the pH of the reaction system to at least 9. Such a starting compound capable of providing a trivalent metal cation $M^{3+}$ may, for example, be a compound capable of providing alkali as well as $M^{3+}$, such as sodium aluminate and potassium aluminate. If desired, the above-exemplified other alkalies may be used in combination even when such specified alkaline compounds are used.

According to the process of this invention, the basic magnesium compound in the form of needle-like crystals is contacted in the above-exemplified liquid reaction medium with the above-exemplified compound capable of providing a trivalent metallic cation $M^{3+}$ under conditions which do not cause a loss of the needle-like crystalline shape of the basic magnesium compound, while maintaining the pH of the reaction system at not less than 9 (in an alkaline condition) and the mole ratio of $M^{3+}$ to the sum of $Mg+M^{3+}$ at $0<M^{3+}/(Mg+M^{3+})\leq 0.6$.

The above contacting treatment can be performed, for example, by contacting a suspension of the basic magnesium compound having a needle-like crystal structure with the compound capable of providing $M^{3+}$ in the liquid reaction medium in the optional presence of the above-exemplified alkali. The basic magnesium compound may be subjected to a drying treatment prior to use. The drying treatment should preferably be carried out such that its water of crystallization is partly liberated under conditions which do not cause a loss of its needle-like shape. Excessive drying which causes a loss of the needle-like crystal shape of the magnesium compound is not desirable. The basic magnesium compound may of course be used without pre-drying treatment.

The aforesaid contacting treatment may be carried out in various modes.

For example, it can be carried out by adding the compound capable of providing $M^{3+}$ and the basic magnesium compound having a needle-like crystal shape, successively in an optional sequence or simultaneously, to the liquid reaction medium containing the alkali dissolved therein or not containing the alkali (for example, when an alkali metal aluminate is used as the compound capable of providing $M^{3+}$). Or the compound capable of providing $M^{3+}$, the basic magnesium compound and optionally the alkali may be added to the liquid reaction medium either successively in an optional sequence or simultaneously. In this mode, the alkali may be added to a system consisting of the liquid reactiom medium, the compound capable of providing $M^{3+}$ and the basic magnesium compound.

The amount of the alkali used in the reaction system is the one which is sufficient to maintain the pH of the reaction system at note less than 9, preferably not less than 10, more preferably not less than 11. Where the compound capable of providing $M^{3+}$ is a compound capable of providing both $M^{3+}$ and alkali, the amount of the alkali includes the amount of this compound. Specifically, the preferred amount of the alkali is about 1 to about 2 equivalents per equivalent of the anion $A^{n'-}$ of the basic magnesium compound and the trivalent metal cation $M^{3+}$.

The pH of the reaction system usually decreases as the reaction proceeds. The contacting treatment should be carried out such that when the pH of the reaction system reaches an equilibrium, it is not less than 9, preferably not less than 10, more preferably not less than 11. As desired, an additional amount of the alkali metal may be charged during the reaction.

The suitable concentration of the alkali is, for example, at least 1 mole/liter, preferably at least 3 moles/liter, and the alkali is preferably a strongly alkaline alkali such as sodium hydroxide or potassium hydroxide.

The reaction proceeds at room temperature. Preferably a reaction temperature of more than about 60° C., especially about 90° to about 150° C., is employed. When it is desired to obtain the fibrous hydrotalcite in a high yield, the reaction is carried out, for example, at a temperature of at least about 60° C., preferably about 90° to about 150° C. while adjusting the pH at equilibrium of the reaction system to at least 10, preferably at least 11. The optimum reaction conditions may be determined by properly selecting the alkaline condition and the temperature condition. These conditions can be easily determined experimentally. The reaction time can be suitably selected, and is, for example, about 1 to about 5 hours.

As a result of the contacting treatment described above, a part, or the whole, of the anion $A^{n'-}$ of the basic magnesium compound of formula (2) is replaced by $OH^-$, and the compound is thus converted to a fibrous hydrotalcite. Preferred fibrous hydrotalcites are represented by the following formula (1).

$$Mg_{1-x_1}M_{x_1}{}^{3+}(OH)_{2+x_1-ny}A_y{}^{n-}.m_1H_2O \tag{1}$$

wherein $M^{3+}$ represents a trivalent metal cation, $A^{n-}$ represents an anion having a valence of n, and $x_1$, y and $m_1$ are numbers which satisfy the following conditions, $$0<x_1\leq 0.6,$$

$0 < y \leq 0.5,$ $0 \leq m_1 \leq 2.$

The anion $A^{n-}$ in formula (1) may be different in valence and/or kind from the anion $A^{n'-}$ of the starting basic magnesium compound of formula (2). Such a compound may be formed by contacting a compound of formula (1) in which the anion $A^{n-}$ is an anion $A^{n'-}$ in a liquid medium which is inert to the above compound and does not dissolved (does not substantially dissolve) the compound, with a compound soluble in the liquid medium and capable of providing $A^{n-}$ having a different valence and/or a different kind from the anion $A^{n'-}$.

Examples of the compound capable of providing $A^{n-}$ having a different valence and/or a different kind from the anion $A^{n'-}$ include sodium carbonate, potassium carbonate, sodium thiosulfate, sodium chromate, disodium hydrogen phosphate, sodium phosphate, potassium ferricyanide, potassium ferrocyanide, sodium silicate, sodium fluoride, sodium perchlorite, sodium oxalate, sodium malonate, sodium salicylate, sodium citrate and sodium tartrate.

Specific examples of the liquid medium are water, methyl alcohol, ethyl alcohol and acetone.

The above contacting treatment may be carried out by contacting the compound of formula (1) in suspension in which the anion $A^{n-}$ is the anion $A^{n'-}$ in the above-exemplified liquid medium with the above-exemplified compound soluble in the liquid medium in an amount which gives at least one equivalent, per equivalent of the anion $A^{n'-}$, of the anion $A^{n-}$, for about 30 minutes to about 20 hours at a pH of at least 4 at which the hydrotalcite compound is not soluble and also at a pH at which the above-exemplified compound capable of giving the anion $A^{n-}$ can be present as an anion. The temperature for this contacting treatment is not particularly limited, but preferably, it is from room temperature to about 90° C.

Examples of $M^{3+}$ of the hydrotalcite of formula (1) having a hexagonal needle-like crystal structure in accordance with this invention include $Al^{3+}$, $Fe^{3+}$, $Cr^{3+}$, $Y^{3+}$, $Ti^{3+}$, and $In^{3+}$. Examples of $A^{n-}$ and $OH^-$, $Cl^-$, $NO_3^-$, $F^-$, $CO_3^{2-}$, $SO_4^{2-}$, $SiO_3^{2-}$, $HPO_4^{2-}$, $[Fe(CN)_6]^{3-}$,

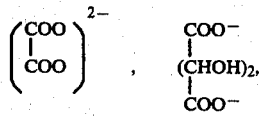

$Br^-$, $I^-$, $CH_3COO^-$, $C_6H_4OHCOO^-$, $ClO_4^-$, and $\partial Fe(CN)_6]^{4-}$.

The basic magnesium compound of formula (2) having a needle-like crystal shape can be formed, for example, by reacting a magnesium compound, for example a halogen compound of magnesium or a magnesium salt of an inorganic or organic acid, with an alkaline structure, preferably a weakly alkaline substance, in an aqueous medium.

Examples of the magnesium compound include magnesium chloride, magnesium bromide, magnesium iodide, magnesium nitrate, magnesium sulfate, sea water, ion bittern (concentrated sea water left after removal of sodium chloride from sea water), and magnesium acetate. Examples of the alkaline substance are ammonia, ammonium hydroxide, slaked lime, magnesium oxide, sodium hydroxide and potassium hydroxide. Weakly alkaline substances such as ammonia, ammonium hydroxide and slaked lime are preferred. The higher the concentration of the magnesium compound in the aqueous solution, the easier it is to form a basic magnesium compound having a needle-like crystal structure. The suitable concentration of the magnesium compound is at least about 30 g/liter of aqueous medium, preferably at least about 50 g/liter, calculated as MgO.

Since the reaction between the magnesium compound and the alkaline substance proceeds at room temperature, it is not particularly necessary to cool or heat the reaction mixture. If desired, such temperature conditions may be employed. When these compounds are hydrothermally treated at about 100° to about 250° C. for several hours, the needle-like crystals of the basic magnesium compound can be grown further. Furthermore, the needle-like crystals of the basic magnesium compound can be grown further by aging it in the mother liquor for a suitable period of time at a temperature of, for example, about 0° to about 150° C., preferably about 40° to about 100° C., without stirring, and this aging frequently produces favorable results. The amount of the alkaline substance used can be selected properly, and is, for example, about 0.05 to about 0.5 equivalent per equivalent of the magnesium compound.

An example of producing such a starting basic magnesium compound is specifically described. For example, a basic magnesium compound having a needle-like crystal structure and represented by the formula $Mg_3(OH)_5Cl\cdot 4H_2O$ precipitates when about 0.1 to about 0.3 equivalent of an alkaline substance such as slaked lime is added to an aqueous solution containing magnesium chloride and the mixture is allowed to stand at room temperature for several hours. Preferably, the reaction procuct as obtained may be aged for several hours to several months at a temperature of, for example, about 60° C. to about 100° C. to grow the resulting needle-like crystals further. By subsequently treating the mother liquor of the reaction product system hydrothermally for several hours at a temperature of not more than about 150° C., for example about 105° to about 150° C., the needle-like crystals can be grown to a greater extent. The basic magnesium compound having a fully grown needle-like crystal structure frequently produces favorable results because it is conductive to increasing the yield of the fibrous hydrotalcite of this invention which is to be obtained by contacting it with the compound capable of providing a trivalent metal cation $M^{3+}$ and the alkali in a liquid medium inert to the magnesium compound and incapable of dissolving the magnesium compound, and also it can lead to the formation of fibrous crystals having a higher length-to-diameter ratio.

The fibrous hydrotalcites of this invention are useful in all fields in which conventionally known hydrotalcites in the form of crystalline plates find application. Moreover, they have a high utilitarian value in a wide range of new fields which make use of their fibrous shape. For example, they are useful as a fire retardant for thermoplastic and thermosetting resins as is the case with conventional hydrotalcites, and are also effective as an inorganic fibrous filler for these resins to provide improved mechanical properties. Hence, they can serve the dual function of a fire retardant and a reinforcing agent which is like glass fibers in FRP. They are further useful as antacids and anionic adsorbents. They are also useful in the form of a filler or a press-molded article in electrical materials, particularly electric insulating materials, filter materials, and abrasive-reinforcing materials. They have excellent thermally insulating properties, and find application as thermally insulative materials in buildings, refrigerating machines, air conditioners, and industrial devices and instruments. They are also expected to find extensive application as sound absorbing and soundproofing materials, anti-corrosive materials, roofing materials, concrete fillers, heat insulating or heat-resistant sheet materials, etc. Other uses include thickeners for unsaturated polyesters, heavy oil additives, carriers of Ziegler catalysts for polyolefin polymerization, acid neutralizing agents, agents for sugar refining, raw materials for potassium fertilizers, and raw materials for refractory bricks.

The following Examples illustrate the hydrotalcites of this invention and production thereof.

EXAMPLE 1

Eight liters of an aqueous solution of a mixture of 2.3 moles/liter of magnesium chloride and 0.4 mole/liter of calcium chloride was adjusted to a temperature of about 20° C., and 136 g (corresponding to 0.1 equivalent per equivalent of magnesium chloride) of powdery calcium hydroxide was added. The mixture was fully stirred for about 10 hours. Insoluble materials were removed by filtration, and the filtrate was allowed to stand at room temperature for 90 hours to precipitate needle-like crystals. The product was heated to 100° C. and aged at this temperature for 4 hours, and thereafter further aged at room temperature for 3 days. The resulting needle-like crystals were separated by filtration, washed fully with water, and dried, X-ray diffraction analysis of the dried crystals showed that the product was basic magnesium chloride in needle-like crystals having the composition $Mg_2(OH)_3Cl.4H_2O$.

Water (700 ml) and 7.3 ml of sodium aluminate ($Al^{3+}=5.43$ moles/liter, $NaOH=9.54$ moles/liter) were put into a 1-liter autoclave, and the aforesaid water-washed needle-like magnesium chloride was added (pH 12.8). The mixture was hydrothermally treated at 120° C. for 4 hours with stirring. The amount of the sodium aluminate added corresponded to about 1 equivalent of the chlorine contained in the basic salt. The product was taken out (pH=11.8) from the autoclave, filtered, washed with water, dehydrated, and dried.

X-ray diffraction analysis led to the determination that the product was a hydrotalcite compound. By chemical analysis and thermal analysis, the chemical composition of the product was found to be approximately $Mg_{0.8}Al_{0.2}(OH)_{2.09}Cl_{0.11}.0.42H_2O$.

The length-to-diameter ratio of the resulting hydrotalcite, determined under an electron microscope at a magnification of 1000 X, was from 40 to 60.

EXAMPLE 2

To 14 liters of ion bittern ($MgCl_2=1.63$ moles/liter, $CaCl_2=0.705$ mole/liter) at 20° C. was added 46 g (corresponding to an $MgO:MgCl_2$ mole ratio of 1:20) of magnesium oxide. With stirring, the mixture was heated to 90° C. When the temperature of the mixture reached 90° C., the heating was stopped, and the mixture was allowed to stand at 20° C. for 70 hours to precipitate needle-like crystals. The crystals were again heated to 80° C., and aged at this temperature for 30 minutes, followed by filtration and washing with water. The water-washed crystals were dried, and analyzed by X-ray diffraction. The product was determined to be $Mg_3(OH)_2Cl.4H_2O$. The water-washed product was suspended in 500 ml of water, and the suspension was well stirred. Aluminum chloride (0.03 mole) was added to the suspension and completely dissolved. The solution was heated to 60° C., and 200 ml of sodium carbonate (0.8 mole/liter) was added (pH=11.5). The mixture was maintained for about 30 minutes (the pH after equilibrium was 10.2). The product was then allowed to cool to room temperature, filtered, washed with water, dehydrated, and dried. X-ray diffraction analysis showed that the dried product was a hydrotalcite compound having the approximate chemical composition $Mg_{0.75}Al_{0.25}(OH)_{1.9}(CO_3)_{0.13}.0.47H_2O$.

The length-to-diameter ratio of the hydrotalcite, determined under an electron microscope at a magnification of 1000 X, was from 30 to 70.

The water-washed product (8 g calculated as a dried product) was suspended in 500 ml of water at room temperature, and with sufficient stirring, 0.016 mole of ferric sulfate was added. The temperature of the mixture was raised to about 70° C., and sodium hydroxide was added to adjust the pH of the mixture to 12.5.

The mixture was then stirred for about 1 hour, whereupon the pH of the mixture reached an equilibrium at 11.5. The product was filtered, washed with water, dehydrated, and dried. The dried product was determined to be a hydrotalcite compound as a result of X-ray diffraction analysis. The product was found to have the approximate chemical composition $Mg_{0.8}Al_{0.2}(OH)_2(SO_4)_{0.1}.0.6H_2O$.

The length-to-diameter ratio of the resulting hydrotalcite, determined under an electron microscope at a magnification of 1000, was from 15 to 20.

EXAMPLE 4

To 10 liters of an aqueous solution of magnesium chloride (40 mole/liter) was added 104 g of magnesium oxide having a purity of 93% at about 20° C. With stirring, the mixture was heated to about 70° C. Then, the heating was stopped, and the mixture was allowed to cool to room temperature for about 1 day, then again heated to 40° C., and maintained at this temperature for 4 days. Then, a part of the resulting compound was filtered and washed with water. When the washed compound was dried and analyzed by X-ray diffraction, it was determined to be basic magnesium chloride in needle-like crystals having the composition $Mg_2(OH)_3Cl.4H_2O$.

The water-washed compound $Mg_2(OH)_3Cl.4H_2O$ obtained above was suspended in about 5 liters of water, and with stirring, 0.6 mole of ferric nitrate was added and completely dissolved. The solution was heated to 60° C., and 3 moles/liter of sodium hydroxide was added to adjust the pH at equilibrium to 10.5 To the resulting system was further added 0.3 mole of sodium tartrate, and the mixture was stirred for about 30 minutes. The resulting product was filtered, washed with water, dehydrated, and dried. The dried product was determined to be a hydrotalcite as a result of X-ray diffraction analysis. The approximate chemical composition of this product was

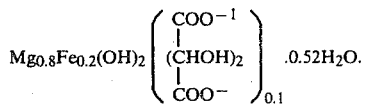

The length-to-diameter ratio of the resulting hydrotalcite, determined under an electron microscope at a magnification of 1000 X, was from 200 to 250.

EXAMPLE 5

414 g of $Mg_2(OH)_3Cl \cdot 4H_2O$ prepared by the method of Example 4 was suspended in about 5 liters of water, and with stirring, 0.86 mole of chromium nitrate was added and completely dissolved. The solution was heated to about 40° C., and sodium hydroxide (5 moles/liter) was added until the pH at equilibrium reached about 10. To the resulting system was further added 0.3 mole of potassium ferrocyanide, and the mixture was stirred for about 30 minutes. The product was filtered, washed with water, dehydrated, and dried. X-ray diffraction analysis showed that the dried product was a hydrotalcite. The chemical composition of the hydrotalcite was found to be approximately $Mg_{0.7}Cr_{0.3}(OH)_2 \cdot [Fe(CN)_6]_{0.075} \cdot 0.83H_2O$.

What we claim is:

1. Hydrotalcites having a hexagonal needle-like crystal structure and having a length-to-diameter ratio, determined by an electron microscope at a magnification of 1000 X, of at least about 10, said hydrotalcites having the following formula:

$$Mg_{1-x_1}M_{x_1}{}^{3+}(OH)_{2+x_1-ny}A_y{}^{n-} \cdot m_1H_2O \quad (1)$$

wherein $M^{3+}$ represents a trivalent metal cation, $A^{n-}$ represents an anion having a valence of n, and $x_1$, y and $m_1$ are numbers satisfying the following conditions:

$0 < x_1 \leq 0.6,$ $0 < y \leq 0.5,$ $0 \leq m_1 \leq 2.$

2. The hydrotalcites of claim 1 wherein $M^{3+}$ is a trivalent metal cation selected from the group consisting of $Al^{3+}$, $Fe^{3+}$, $Cr^{3+}$, $Y^{3+}$, $Ti^{3+}$ and $In^{3+}$.

3. The hydrotalcites of claim 1 wherein $A^{n-}$ is an anion selected from the group consisting of $OH^-$, $Cl^-$, $NO_3^-$, $F^-$, $CO_3^{2-}$, $SiO_3^{2-}$, $SO_4^{2-}$, $HPO_4^{2-}$, $[Fe(CN)_6]^{3-}$,

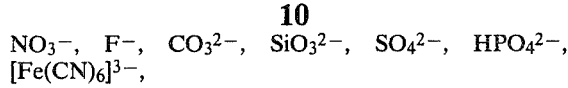

4. A process for producing a hydrotalcite having a hexagonal needle-like structure and having a length-to-diameter ratio, determined by an electron microscope at a magnification of 1000 X, of at least 10, said hydrotalcite having the following formula:

$$Mg_{1-x_1}M_{x_1}{}^{3+}(OH)_{2+x_1-ny}A_y{}^{n-} \cdot m_1H_2O \quad (1)$$

wherein $M^{3+}$ represents a trivalent metal cation, $A^{n-}$ represents an anion having a valence of n, and $x_1$, y and $m_1$ are numbers satisfying the following conditions:

$0 < x_1 \leq 0.6,$ $0 < y = 0.5,$ $0 < m_1 \leq 2;$ said process comprising contacting a basic magnesium compound having a needle-like crystal structure and expressed by the following formula (2):

$$Mg(OH)_{2-n'x_2}A_{x_2}{}^{n'-} \cdot m_2H_2O \quad (2)$$

wherein $A^{n'-}$ represents a monovalent or divalent anion, n' is 1 or 2, and $x_2$ and $m_2$ are numbers satisfying the following conditions:

$0.2 \leq x_2 \leq 0.5,$ $0 < m_2 \leq 2,$ with a compound capable of providing a trivalent metal cation and being soluble in a liquid reaction medium which is chemically inert and is a non-solvent for the basic magnesium compound, the contacting being carried out in said liquid reaction medium under conditions which do not cause a loss of the needle-like crystal form of the basic magnesium compound, while maintaining the ratio of $M^{3+}$ to the sum of Mg and $M^{3+}$ at $0 < M^{3+}/(Mg + M^{3+}) \leq 0.6$ and the pH of the contacting system at not less than 9.

* * * * *